March 7, 1967 J. J. SMITH 3,308,220
PLASTIC MESH PRODUCING MACHINE
Filed April 22, 1964 4 Sheets-Sheet 1

INVENTOR.
JESSE J. SMITH
BY
Wm. H. Dean

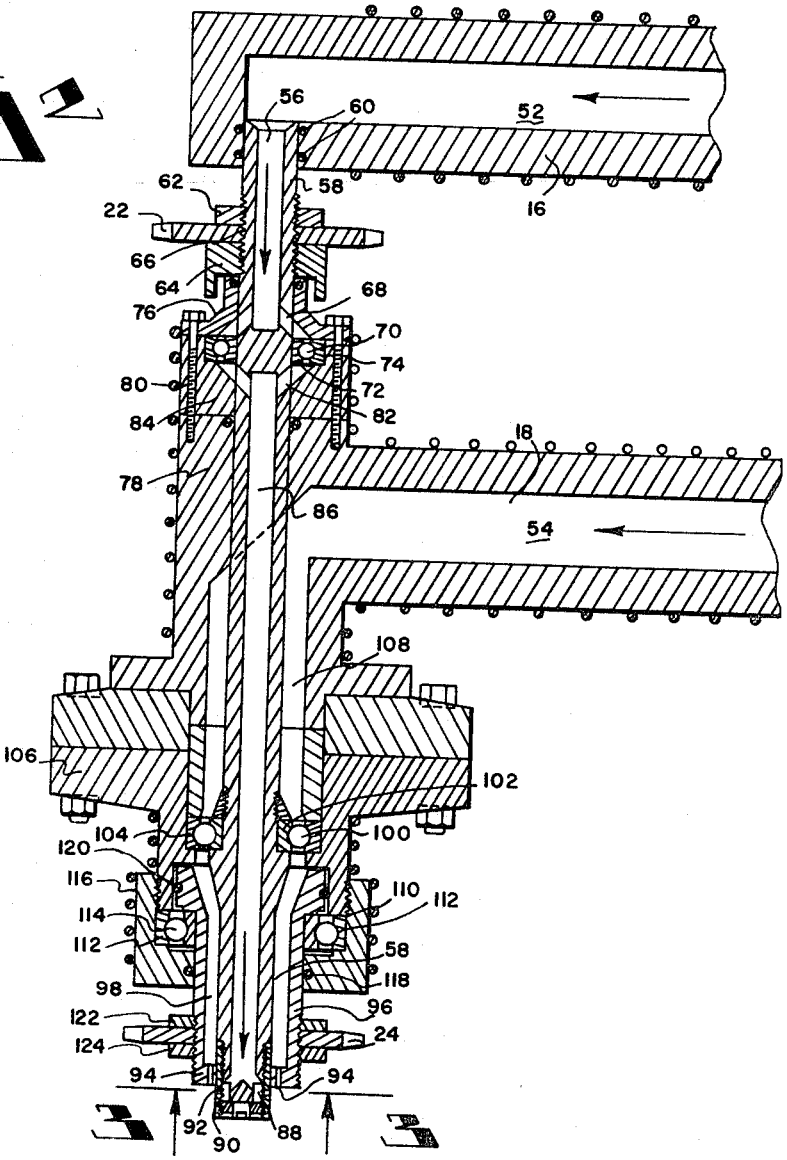

March 7, 1967 J. J. SMITH 3,308,220
PLASTIC MESH PRODUCING MACHINE
Filed April 22, 1964 4 Sheets-Sheet 3
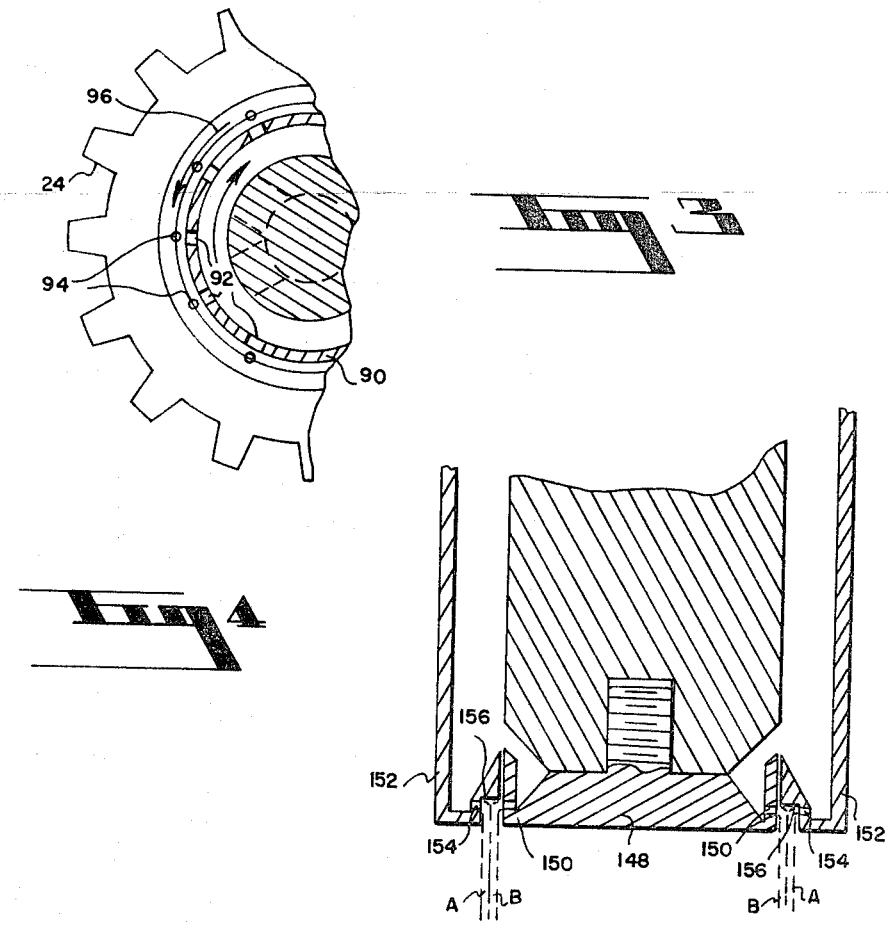
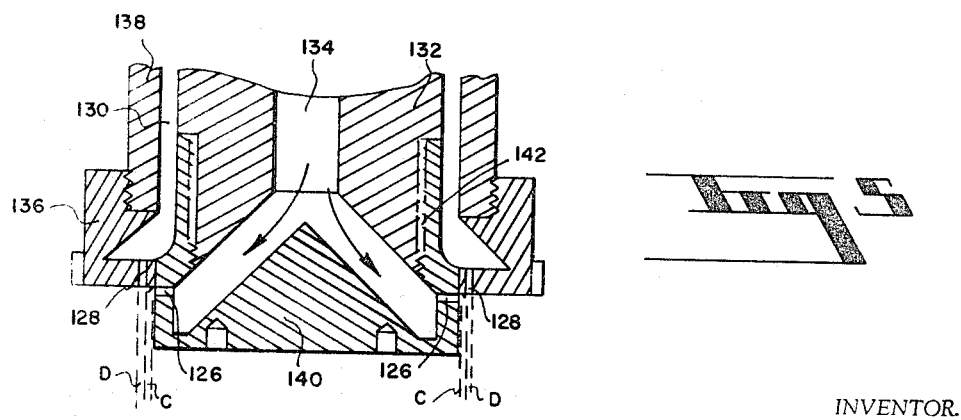
INVENTOR.
JESSE J. SMITH
BY
Wm. H. Dean

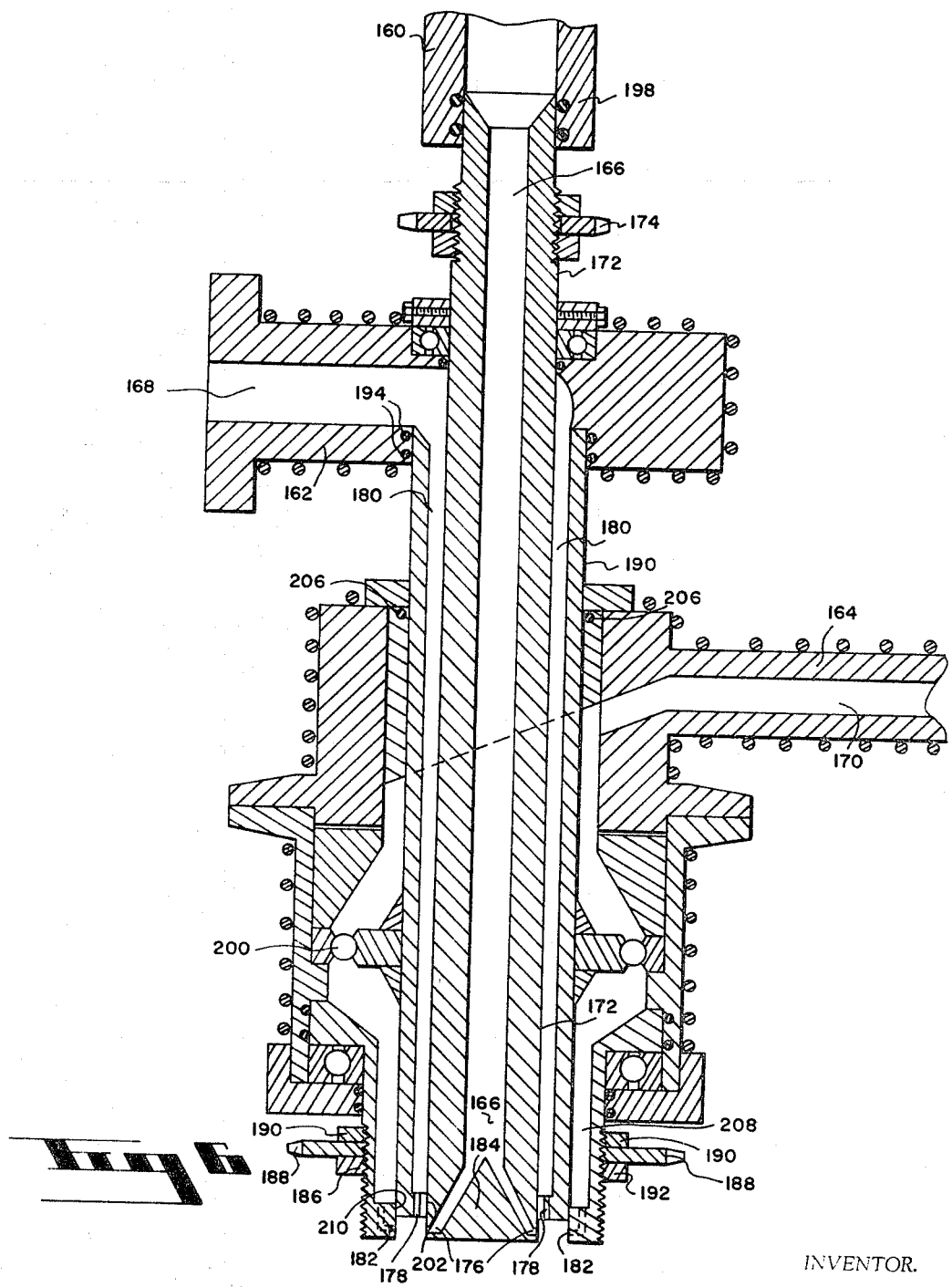

United States Patent Office 3,308,220
Patented Mar. 7, 1967

3,308,220
PLASTIC MESH PRODUCING MACHINE
Jesse J. Smith, Garden City, Kans., assignor to U.N.I. Corporation, Boston, Mass., a corporation of Massachusetts
Filed Apr. 22, 1964, Ser. No. 361,908
9 Claims. (Cl. 264—167)

This invention relates to a plastic mesh producing machine and more particularly to a plastic mesh producing machine comprising relatively movable extrusion dies each having a plurality of orifices disposed to direct hot plastic filaments alternately into impingement with each other to create weldments of the filaments at the intersections of the mesh structures.

Various prior art methods and devices have been used for producing plastic mesh by extrusion of hot plastic and the relative movement of dies so that the dies momentarily register to cause weldments of the filaments during relative movement of the dies, however, such prior art methods and machines lack the versatility in the relative speed operation of the dies as well as the independent delivery of plastic from independent sources to a plurality of dies, whereby various materials of various colors may be extruded and fused into a mesh structure. Furthermore, various prior art machines and methods lack versatility in producing mesh structures wherein the dimensions, as well as the filament cross section of the mesh structures may be greatly varied.

Accordingly, it is an object of the present invention to provide a plastic mesh producing machine and method wherein a plurality of extrusion dies are each provided with a plurality of extrusion openings and the speed of each die is independently variable and controlled by independent drive means while plastic mesh handling means is also variable to effect variable stretching of the hot mesh structures between the extruding dies and a cooling medium, all of which permits a great variety of mesh structures to be produced in accordance with the present invention.

Another object of the invention is to provide a plastic mesh producing machine wherein a plurality of different sources of hot plastic may be conducted through independent passages to individual extruding dies arranged in cooperative relationship with each other to thereby produce a mesh structure of varying colors and of different materials.

Another object of the invention is to provide a novel plastic mesh producing machine wherein hot plastic flowing to the extrusion dies also flows through the rotary die supporting bearings to thereby lubricate the bearings automatically by means of the plastic flowing to the extrusion dies of the machine.

Another object of the invention is to provide a plastic mesh forming machine having concentric relatively rotatable dies provided with annular rows of orifices wherein one annular row of orifices is directed radially upward and another row of orifices is directed radially inward so that plastic extruded from the two rows of orifices meet therebetween in a diametrically opposite direction and thereby form efficient fusion welds during the production of plastic mesh by means of the machine of the invention.

Another object of the invention is to provide a plastic mesh producing machine having three concentric extruding dies each provided with an annular row of extruding orifices; two of said dies being relatively rotatable about the third die which is stationary; said third die being disposed between the relatively rotatable concentric dies whereby a plastic mesh structure may be extruded and welded together and formed of three separate colored materials.

Another object of the invention is to provide a plastic mesh producing machine wherein a plurality of relatively movable dies are each provided with a plurality of extrusion orifices which are relatively movable with respect to each other and whereby the orifices of the dies are directed generally toward each other so that hot plastic extrudes therefrom impinges with hot plastic extruded from the other of the dies to effect a fusion weld between the plastic filaments extruded from the orifices during relative movement of the orifices thereby automatically providing a machine which will produce plastic mesh utilizing separately supported spaced orifices without the necessity of employing a mandrel for forcing the separate filaments together to cause them to become welded together.

Another object of the invention is to provide a plastic mesh producing machine wherein a plurality of relatively movable dies are each provided with a plurality of spaced orifices. The spaced orifices of each die spaced from the orifices of the other dies of the plurality, each die being separately movably driven by a variable speed device whereby the mesh size of a mesh structure may be varied and whereby a variable speed means pulling the mesh away from the dies may also vary the mesh size, as well as the diameter of the filaments, before they are cooled into a hardened state.

Further objects and advantages of the present invention may be apparent from the following specification, appended claims and accompanying drawings, in which:

FIG. 2 is a vertical sectional view through the extruding dies of the machine, shown in FIG. 1 and illustrating such equipment on enlarged scale;

FIG. 3 is an enlarged fragmentary sectional view taken from the line 3—3 of FIG. 2;

FIG. 4 is an enlarged fragmentary sectional view of extrusion dies taken on substantially the same plane as that shown in FIG. 2, but showing a modification of the invention and illustrating by broken lines the impingement flow of plastic passing through diametrically opposed sets of radially directed orifices having an annulus between the annular rows of orifices of the dies;

Figure 1:
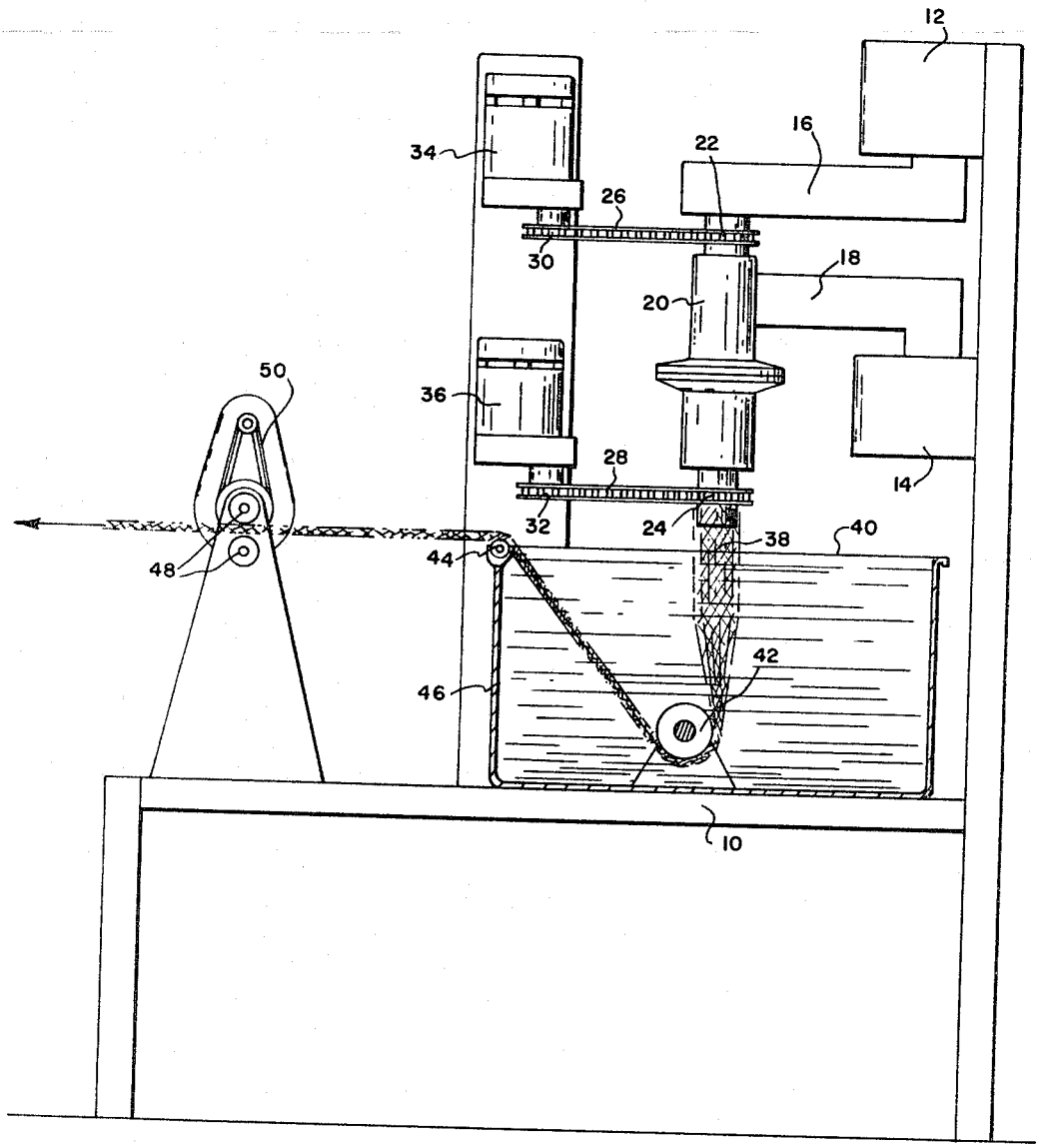
FIG. 1 is a diagrammatic illustration of a plastic mesh producing machine and related equipment.

FIG. 5 is a fragmentary sectional view similar to FIG. 4 showing a further modification of the separate extrusion dies of the invention and showing one annular row of extrusion orifices directed radially and another annular row of extrusion orifices directed in generally axially parallel relation to the rotating axis of the dies, whereby flow from both sets of orifices impinges to cause weldments of the plastic filaments as they are extruded from the orifices during relative rotation of the dies; and FIG. 6 is an axial sectional view similar to FIG. 2 showing details of the plastic extruding dies of the invention and illustrating a modification wherein three separate sources of hot plastic may be extruded concurrently through three separate annular rows of die orifices in such a manner that all three sets of filaments passing from the three sets of orifices will become welded together and formed into a plastic mesh structure which may thereby be composed of materials of three different colors, if desired.

The machine of the invention, shown diagrammatically in FIG. 1 of the drawings, comprises a frame 10 having high pressure plastic extruders 12 and 14 mounted thereon. These extruders are provided with outlet conduit sections 16 and 18, respectively, disposed to conduct hot plastic under pressure to a die assembly 20 having rotatable die driving sprockets 22 and 24 engaged by chains 26 and 28 driven by sprockets 30 and 32 which are secured to output shafts of variable speed gear motors 34 and 36. The gear motors 34 and 36 thus each independently drives a rotary extruding die in connection with the respective sprockets 22 and 24, and the variable speed of these motors 34 and 36 permits the dies to be rotated relative to each other at various speeds. The dies extrude hot plastic mesh at 38 which is immersed in a coolant having an upper surface 40. The mesh passes over a rotatable roller 42 in a lower level of the coolant and upwardly over a roller 44 at an elevated position with relation to the fluid contained in the tank 46. Thus the mesh passes out of the tank 46 and between dry rollers 48, one of which is operable by a variable speed gear motor 50 so that the plastic mesh 38 between the dies and the coolant level 40 may be pulled away at various speeds thereby controlling one dimension of the mesh and also controlling elongation of the filaments and thereby the relative diameter with respect to the extrusion diameter. It will be understood that the more rapidly the mesh is pulled away at 38 the more it is stretched and the smaller the filament diameters of the mesh will be.

Referring now specifically to the disclosure of FIG. 2 it will be seen that the extruder delivery conduits 16 and 18 are provided with hot plastic delivery passages 52 and 54, respectively, in which hot plastic is delivered under high pressure and in a molten state. The passage 52 communicates directly with a bore 56 of a hollow shaft 58 and seals 60 surround the shaft 58 to prevent leakage of plastic therearound as it is forced axially through the bore 56 and downwardly toward the extrusion dies, as will be hereinafter described.

Secured to the shaft 58 by means of lock nuts 62 and 64 and a key 66 is the sprocket 22 hereinbefore described.

The bore 56 is provided with lateral passages 68 which communicate with ball bearings 70 between inner and outer races 72 and 74, respectively, thereof. The inner race 72 supports the shaft 58, while the outer race 74 is held by a bearing cap 76 secured to a die frame 78 by means of screws 80.

Extending from the bearing members 70 and downwardly into the shaft are passages 82, it being noted that the passages 68 and 82 are in the shaft 58, while communicating passages in the cap 76 and a complemental bearing support cap 84 are annular and communicate directly with the bearings 70 so that the lateral passages 68 and 82 are always in communication with lateral annular passages fully communicating with the bearings 70. Thus hot plastic flows through and around the bearings 70 in order to lubricate them as the shaft 58 is rotatably supported by the ball bearing assembly, including the rotatable spherical bearing element 70. The lateral passages 82 communicate with a secondary bore 86 in the shaft 58, said bore 86 aligning with the bore 56. The bore 86 of the shaft 57 extends downward into communication with an annulus 88 inward of a hollow cylindrical extrusion die 90 screw threadably fixed to the shaft 58 and having an annular row of extrusion orifices 92 directed radially outward to deliver plastic which moves downwardly through the bore 86 under pressure. These orifices 92 deliver plastic at right angles to plastic delivered by an annular row of orifices 94 in a die member 96 which rotates these orifices 94 axially parallel to the axis of rotation of the die 96, and plastic from the orifices 92 impinges at right angles with plastic from the orifices 94 in a similar manner to that as will be hereinafter described in connection with FIG. 5 of the drawings.

The die 96 is a hollow die having a bore 98 larger than the external diameter of the shaft 58, said bore 98 communicating with the extrusion orifices 94 so that an annulus is provided betweeen the bore 98 and the shaft 58 serving as a flow passage for hot plastic which is forced downwardly through the orifices 94 as will be hereinafter described. The bore 98 communicates with ball bearings 100 held in inner and outer bearing races 102 and 104. The inner race 102 supporting the shaft 58 and the outer race 104 being clamped in a stationary housing member 106 rigidly secured to the conduit section 18.

The bearings 100 are thus directly communicating with the bore 98 and above the bearings 100 is an annular flow passage 108 communicating directly with the passage 54 of the conduit 18. Thus hot plastic flowing from the extruder 14 through the conduit section 18 passes downwardly through the bearings 100 and outwardly through the orifices 94 whereby extrusion of the plastic is accompanied by flow of plastic through the bearings 100 to provide lubrication for them.

Surrounding the die 96 is an inner race 110 and an outer race 112 between which bearings 114 are rotatably mounted. The inner race 110 surrounds and supports the die 96, while the outer race 112 is clamped against the housing portion 106 by a clamp ring 116 screw threaded thereon. This clamp ring 116 is provided with a suitable annular seal 118 surrounding the outer annular surface of the die 96 to thereby maintain lubrication sealed in and around the bearing 114. Likewise, an upper end of the die 96 above the bearing 114 is provided with a seal 120 to prevent the escape of lubrication from the bearing 114.

Secured externally of the die 96 by means of an externally screw threaded section thereof, and lock nuts 122 and 124, is the sprocket 24.

Inasmuch as the orifices 92 and 94 are shown on reduced scale, reference is made to FIG. 5 of the drawings wherein comparable orifices in accordance with the invention are shown on larger scale for the purpose of illustrating flow impingement of plastic filaments during relative rotation of the dies. In the structure, as shown in FIG. 5 of the drawings, extrusion orifices 126 are similar to the orifices 92 and extrusion orifices 128 are similar to the orifices 94 hereinbefore described.

A plastic flow passage 130 is formed by an annulus surrounding a hollow shaft 132 similar to the shaft 58 hereinbefore described. And another hot plastic flow passage 134 is provided by the central bore in the shaft 132. This passage or bore 134 is similar to the hereinbefore described bore 86 of the shaft 58.

The orifices 128 are disposed in an annular row similarly to the orifices 94, shown in FIGS. 2 and 3 of the drawings, and the orifices 126 are disposed in an annular row himilar to the orifices 92, shown in FIGS. 2 and 3 of the drawings. The orifices 128 are disposed in a rotating die 136 connected to a hollow cylindrical member 138 similar to the sprocket 24, and the shaft 132 and passage The member 138 and die 136 are rotated by a sprocket similar to the sprocket 24, and the shaft 132 and passage 134 are rotated by a sprocket similar to the sprocket 22, hereinbefore described.

It will be seen that the orifices 126 are radially disposed and are in communication with molten plastic under pressure in the passage 134, and that this plastic tends to be extruded radially outward into interference and contact with plastic being extruded through the orifices 128 downwardly and in parallel relation to the axis of the shaft 132 and rotating die 136.

The plastic extruded through the orifices 136 and 128 may be termed filaments and these molten filaments as they impinge against each other become welded together during a time when the orifices 126 register with the orifices 128 and the material flowing from these orifices is in an impinging position. It will be appreciated that the dies containing these orifices may be rotated in different directions and/or at different speeds in the same direction, and that the length of the impingement welding of the individual filaments depends upon the speed of rotation and the relative direction of rotation of the dies. Additionally, the size of the mesh is also controlled by the relative speeds of the dies and the relative directional rotational operation of the dies, while the length of the filaments and the diameter of the filaments of the mesh shown in FIG. 1 may vary in accordance with the withdrawal speed of the mesh by the rollers 48 and the relative stretching of the filaments before they reach the surface of the coolant fluid, shown at 40 in FIG. 1 of the drawings.

The orifices 126, being in an annular row in a die 140, may be adjusted axially of the shaft 132, or toward and away from the orifices 128 by means of a screw threaded shank 142 of the generally cup-shaped die 140, whereby these threads may have an interference fit or a locking means permitting the die to be adjusted axially of the shaft 134 so that the annular row of orifices 126 may be spaced axially of the rotational axis of the dies beyond the outlet end of the orifices 128, or the orifices 126 may be very close to the outlet ends of the orifices 128, as shown in FIG. 5 of the drawings. Additionally, it will be noted that inasmuch as these dies are annular they produce a generally tubular formation of plastic mesh, and thus the overall diameter of this tubular formation may be varied by varying the diameters of the dies 136 and 140, and these dies being screw threadably connected to the members 138 and the shaft 132 may be replaced so that the diameters of the annular rows of orifices 126 and 128 may readily be varied for producing mesh structures of varying diameters simply by changing the dies.

It will be apparent to those skilled in the art that the spacing of the orifices 126 and 128 may be varied, and that a greater number of orifices 126 may be provided relative to the number of orifices 128, or vice versa, to thereby vary the mesh arrangement of the filaments extruded from one die relative to the respective filaments extruded from another of the dies.

In accordance with the present invention, it will be apparent that the annular axial extrusion axis of one set of orifices relative to that of another set of orifices provides positive impingement of the filaments and permits fusion welding of the filaments together without any internal or external mandrels. In accordance with the invention, the flow of filaments from one set of orifices may be at substantially right angles to that of the filaments from another set of orifices, or the orifices may be directly opposed to each other so that the flow from the orifices of one die is directly opposite to that from the flow from another die. As, for example, in FIG. 4 the structures are so arranged that one die is provided with an annular row of orifices directed radially inward, while another die is provided with a row of orifices having axes directed radially outward so that these orifices are substantially radially aligned with each other, and at substantially right angles to the concentric rotational axis of both dies. Thus the structure in FIG. 4 comprises an inner die 148 having an annular row of orifices 150 which are directed radially outward and the outer die 152 is provided with an annular row of orifices 154 which are directed radially inward so that the filaments extruded from the orifices 154 pass radially inward and impinge with filaments passing radially outward from the orifices 150, all as indicated by broken lines in FIG. 4 of the drawings. The filaments designated by broken lines A pass radially inward toward filaments designated by broken lines B which pass radially outward. Thus, the filaments impinge and flow after impingement at right angles to their extrusion axes. In the modification as shown in FIG. 4 of the drawings, an annulus 156 is formed between the annular row of orifices 154 and 150, thereby providing an impingement compression and extruding area confined by the walls of the annulus in which very efficient fusion welding of the filaments occur to form mesh structures as the orifices 150 momentarily or intermittently register with the orifices 154 during relative rotation of the dies 148 and 152. Referring again to the disclosure of FIG. 5 of the drawings, it will be seen that the filaments designated C are produced by extrusion through the orifices 126 and that these filaments must make a right angle turn as they impinge against the filaments designated D, which issue from the orifices 128 parallel to the rotational axis of the dies 136 and 140. This contrasts with operation of the modified structure shown in FIG. 4 of the drawings wherein the filaments issuing from both the orifices 150 and 154 must make a right angle turn before passing toward the coolant surface 40 shown in FIG. 1 of the drawings. It is in the impingement and right angular turning of the filaments that a good efficient welding operation occurs between the hot molten filaments eventually to form the mesh structure produced by the machine and method of the invention. Accordingly, it will be appreciated by those skilled in the art that the method of the invention comprises the extrusion of filaments at an angle to each other and thereby causing impingement of the hot molten filaments whereby impingement of the filaments causes a change in direction of the filaments, thereby creating pressure welding of the filaments together. Further, the method includes the concurrent lateral displacement of the angularly disposed orifices relative to each other so that as the filaments are extruded they are intermittently impinged with and welded to the other filaments issuing at an angle thereto. Further, the method comprises the concurrent extrusion of the separate filaments at an angle to each other and the relative rotation of the orifices or relative movement thereof at different rates whereby the mesh size may be varied. The radially outward extrusion of some of the filaments into impingement with other filaments at an angle thereto provides for the possibility of rotating one die at a substantially different speed than the other, or for varying the speeds of the dies and producing efficient weldments at the intersections of the filaments and at the same time providing for the production of a mesh or net structure wherein the spacing of the mesh may vary greatly. Additionally, the method comprises the varying stretch applied to the welded mesh during its molten state before it reaches the coolant surface 40 to control the elongation of the mesh and the filaments as well as the diameter of the filaments.

It will be obvious that when the mesh is stretched substantially the filament diameters will be drawn and reduced. Therefore, the machine of the present invention operated in accordance with the method of the invention provides very great versatility in the manufacture of plastic mesh structures with respect to the mesh size and the filament size and the mesh shape, as well as the mesh size. It will be appreciated that this means and method of producing plastic mesh is not limited by the necessity for welding the filaments into mesh structures over a fixed size mandrel, and with limitations in the rotational rates of the dies relative to each other, and also with respect to the degree of stretching of the mesh before it reaches the coolant medium.

It will be understood that the molten plastic material under pressure extrudes at a given rate through the orifices of the dies, and, consequently, the mesh formed by the machine will be smaller when the relative speed of the dies are greater, due to the fact that the respective orifices of the rotating dies will more rapidly and more quickly index with each other, consequently a shorter length of filament will be extruded at a given rate during the rotation of the dies from the index of one orifice with the other between two sets of dies. Conversely, the slower the relative movement of the dies, the greater distance will occur between weldment intersections of the mesh. Additionally, it will be understood that the disclosures of FIGS. 4 and 5 are only representative of the angular displacement of the orifices relative to each other, that is to say the angularity of the axes of the orifices of one die relative the axes of the orifices of another die to provide efficient weldment. The orifices as shown in FIG. 4 of opposing dies are axially parallel or substantially 180° apart, while the axes of the orifices shown in FIG. 5 are 90° apart from one die orifice axis to the other die orifice axis. Thus, the counter flow of the plastic filaments causes efficient weldment if sufficient angularity is provided between the orifices of the two dies or the plurality of dies. Substantial flow or impingement interference force of the filaments as they engage each other in their molten state provides for efficient weldment, and the more efficient the weldment angle, the greater the relative speed of the dies may be in order to weave very fine mesh plastic structures and still maintain efficient weldments at the intersections of the filaments.

Accordingly, it is preferred that the angular disposition of the axes of one set of orifices of one die relative to the axes of another set of orifices of another die range between directly opposed orifices 180° apart and orifices disposed 90° apart, as shown in FIGS. 4 and 5, respectively. However, orifices of one set of dies may be operable even though they are only 60° displaced angularly from the orifices of another set of dies. Therefore, the teachings of the present invention may include the angular disposition of the orifices to provide molten plastic impingement ranging from 60° apart to 180° apart. And thus, within this range the flow impingement angle is sufficient to create sufficient pressure and weldment activity of the filaments as they come together so that a great variety of mesh size and die rotational speed may be attained.

In the modification, as shown in FIG. 6 of the drawings, three separate sources of molten plastic are provided to feed three dies, each having a respective annular row of spaced orifices, all of the three rows of orifices being concentric, so that a mesh structure may be produced to include three different filament elements, which may be of three different colors, if desired, so that filaments from one die extend longitudinally of the mesh and filaments from the other two dies may be disposed at various angles thereto and with various mesh dimensions in accordance with the speed of the dies, as hereinbefore described.

Referring now particularly to FIG. 6, it will be seen that three molten plastic conduits 160, 162 and 164 are disposed to conduct molten plastic under pressure into respective passages 166, 168 and 170. The passage 166 comprises the bore of a shaft 172 driven by a sprocket 174 in similar fashion to the driving of the sprocket 22, hereinbefore described.

Plastic flowing down through the bore 166 is extruded through an annular row of orifices 176 at right angles to which an annular row of orifices 178 is fed through an annulus passage 180 communicating with the bore 168 while a third annular row of orifices 182 is directed oppositely to the orifices 176 and at right angles to the orifices 178. The orifices 182 are directed radially inward toward the radially outwardly directed orifices 176, while the orifices 178 are in an annular row between the orifices 176 and 182, and these orifices 178 are axially parallel to the rotational axis of the die 184 carrying the orifices 176. This die 184 is a part of the shaft 172 driven by the sprocket 174.

The orifices 182 are held in a cylindrical die 186 driven by the sprocket 188 which is driven similarly to the sprocket 24 hereinbefore described.

The mechanical support of the die 186 is similar to that hereinbefore described in connection with the die 96, and the support of the shaft 172 is similar to that hereinbefore described in connection with the shaft 58.

The orifices 178 are held by, or may be a part of, a hollow shaft 190 surrounding the shaft 172 in spaced relation to the periphery 192 thereof whereby the annulus 180 is formed to provide a passage to feed plastic through the orifices 178.

The conduit 162 surrounding the bore 168 is provided with seals 194 and 196 so that plastic from the bore 168 feeds efficiently into the annulus 180 and is sealed at its entrance thereto. Likewise the conduit 160 is provided with seals 198 surrounding the shaft 172 to provide an efficient sealing of the plastic under pressure which enters the passage or bore 166 concentrically of the shaft 172.

Bearings 200 are similar to the hereinbefore described bearings 100 and these bearings support the hollow shaft 190 and a lower portion 202 of the hollow shaft 190 supports the lower peripheral portion of the shaft 172 while a bearing 204 supports the upper portion of the shaft 172 in connection with the conduit structure 162 which may rigidly be supported by a frame, such as the frame 10 or any other suitable stationary frame.

Seals 206 provide a seal around the outside of the shaft 190 above the conduit bore 170 in order to seal against the escape of plastic entering an annulus 208 which surrounds the shaft 190 internally of the die 186 which is provided with a lower internal bore portion 210 which bears on the periphery of the shaft 190 and forms a lower end bearing therefor.

In operation, the modified structure is similar to that hereinbefore described, except that the orifices 176 and 182 may correspond with the orifices 150 and 154, as shown in FIG. 4 of the drawings, and additionally, the orifices 178 disposed between the orifices 176 and 182 provide a third filament strand extrusion means extruding the plastic mesh hereinbefore described, whereby the strands from the orifices 178 of the die 190 are disposed axially of the tubular mesh structure, while the filaments from the die orifices 176 and 182 are disposed at various angles thereto in accordance with the relative speeds of the dies 184 and 186.

It will be obvious to those skilled in the art that the three separate sources of plastic under pressure may enter the conduits 166, 168 and 170, and these materials may be of different colors or different structural characteristics, as desired.

In accordance with the methods of the invention, the character of the mesh produced may also be varied by varying pressure of the extruders 12 and 14 in the conduits 16 and 18 and also by causing the same function in connection with the structure shown in FIG. 6 of the drawings. Thus, by varying the pressure of one of the extruders relative to the pressure of the other or by increasing or decreasing both relative to each other inversely of each other, ultimate diameter variation of the filaments extruded by the dies of the invention may be controlled or varied and also varied ratio extrusion may be accomplished to vary the mesh configuration.

Additionally, two separate plastic substances, such as a polyethylene and polypropylene may be used to heat fuse in a common mesh structure and while these are not chemically reactive with each other upon impingement, as hereinbefore described, it is contemplated that the separate extruders 12 and 14 may include separate resins, one of which may be delivered by the extruder 12 while a relatively reactive resin may be delivered by the extruder 14. These separate plastics, when contacting each other by impingement as the filaments leave the die orifices, may react and thereby cause a difference in the bond of the filaments at the crosses of the mesh or may create unusual configurations and this will be controlled in accordance with a chemical reaction as the hot filaments contact and form a weldment with each other. Accordingly, the separate plastics delivered by the separate extruders 12 and 14 may vary in chemistry, such as to be normally active with each other or may be reactive with each other and various reactive materials may be used to produce various effects and various weldments, strengths and intersection configurations. Accordingly, the foregoing greatly enhances the method of the invention to provide versatility of the means and method of the invention.

It will be obvious to those skilled in the art that various modifications of the present invention may be resorted to in a manner limited only by a just interpretation of the following claims.

I claim:

1. In a plastic mesh producing machine the combination of: a plurality of individually and relatively movable hot plastic extrusion dies each having a plurality of spaced apart plastic extruding orifices provided with extruding open ends having extruding axes; said open ends of said orifices of each die spaced from the respective open ends of orifices of an adjacent one of said dies, said open ends of the orifices of one of said dies directed toward the open ends of the orifices of another of said dies to cause extrusion impingement and welding of hot plastic issuing therefrom with the hot plastic issuing from orifices of said one of said dies; said open ends of said orifices disposed such that said impingement and welding occurs outside said dies in free space; the orifices of said one of said dies having their extruding axes directed at an angle relative to the respective extruding axes of the orifices of the other one of said dies, said angle ranging from substantially 90° to substantially 180°; first means for forcing hot plastic under pressure to each of said dies and through said orifices to form plastic filaments; and means for causing relative movement of said dies in a direction laterally of the extrusion axes of said orifices.

2. The invention, as set forth in claim 1, wherein: said last mentioned means comprises an independent variable speed motor driven means for moving each of said dies independently of each other and at different rates of speed.

3. The invention, as defined in claim 1, wherein: said dies each have annular rows of said orifices and all of said rows of all of said dies are concentric with each other and independently rotatable about a common axis.

4. The invention, as defined in claim 1, wherein: quench means is provided for cooling said filaments at a first location spaced relative to said dies; and variable speed means for engaging the quenched filaments to pull the filaments away from said dies and to stretch said filaments at a location between said dies and said first location, whereby elongation of said filaments may be varied relative to the extrusion rate thereof.

5. The invention, as defined in claim 1, wherein: said last mentioned means comprises independent variable speed power drive means for driving each of said dies independently of each other and at different rates of speed; said drive means being a variable speed means adapted to vary the degree of stretching of said mesh and the relative movement rate of said dies.

6. The invention, as defined in claim 1, wherein: said dies are provided with annular rows of said orifices and all of said rows of all of said dies being concentric with each other; passage means for conducting plastic to said dies; and bearing means for supporting said dies in concentric relation with each other, said bearing means having an inner race structure and an outer race structure and rotating elements between said race structures disposed in said flow passage, whereby the flow of plastic material to said dies through said bearing means provides lubrication therefor.

7. The invention, as defined in claim 1, wherein: said dies are provided with annular rows of orifices and all of said rows of all of said dies being concentric with each other; and means for extending one of said dies and the respective annular row of orifices thereof in a direction axially of the axes of rotation of said dies, whereby the plastic filament issuing orifices of one of said dies may be displaced relative to the orifices of another one of said dies axially of the axes of rotation of said dies.

8. The invention, as defined in claim 1, wherein: said dies are provided with annular rows of said orifices and all of said rows of all of said dies are concentric with each other; one of said rows of orifices of one die being directed axially parallel toward orifices of another of said dies, such that plastic issuing from said dies impinges in opposite directions to thereby form an efficient fusion weld of the hot plastic issuing from the orifices of one die with the hot plastic issuing from the orifices of another of said dies.

9. The invention, as set forth in claim 1, wherein: said plurality of independently movable extrusion dies comprise a pair of movable dies having concentric rows of orifices concentrically spaced apart; and a third die concentrically disposed between the concentrically spaced rows of orifices, said third die having a row of orifices disposed to extrude filaments between the annular rows of filaments extruded from the spaced apart annular rows of said movable dies.

References Cited by the Examiner

UNITED STATES PATENTS

| 2,764,781 | 10/1956 | Kelly | 18—30 |
| 3,051,989 | 9/1962 | Mercer | 18—12 |
| 3,070,840 | 1/1963 | Mercer | 264 |
| 3,118,180 | 1/1964 | Nalle | 264 |
| 3,123,512 | 3/1964 | Mercer | 264 |
| 3,149,377 | 9/1964 | Morse | 18—30 |
| 3,163,691 | 12/1964 | Anderson et al. | 264—167 |
| 3,209,408 | 10/1965 | Kelly | 18—30 |

FOREIGN PATENTS

| 656,451 | 1/1963 | Canada. |
| 892,901 | 4/1962 | Great Britain. |
| 955,542 | 4/1964 | Great Britain. |

ALEXANDER H. BRODMERKEL, *Primary Examiner.*

ROBERT F. WHITE, A. L. LEAVITT, F. S. WHISENHUNT, D. J. ARNOLD, *Assistant Examiners.*

Disclaimer 3,308,220.—*Jesse J. Smith*, Garden City, Kans. PLASTIC MESH PRODUCING MACHINE. Patent dated Mar. 7, 1967. Disclaimer filed July 6, 1970, by the assignee, *Universal Netting, Inc.*

Hereby enters this disclaimer to claim 8 of said patent.

[*Official Gazette October 6, 1970.*]